United States Patent [19]
Yana

[11] Patent Number: 5,190,244
[45] Date of Patent: Mar. 2, 1993

[54] ANTIRESONANT SUSPENSION DEVICE FOR A HELICOPTER

[75] Inventor: Victor Y. Yana, Marseilles, France

[73] Assignee: Aerospatiale Societe Nationale Industrielle, Paris, France

[21] Appl. No.: 794,066

[22] Filed: Nov. 19, 1991

[30] Foreign Application Priority Data

Nov. 30, 1990 [FR] France ................. 90 15036

[51] Int. Cl.⁵ .............. B64C 27/51; F01D 5/26; F04D 29/66
[52] U.S. Cl. .................. 244/17.27; 416/500; 188/379; 248/559
[58] Field of Search ............... 244/17.27; 416/30, 500; 188/379, 380; 248/556, 557, 559

[56] References Cited

U.S. PATENT DOCUMENTS

| | | | |
|---|---|---|---|
| 2,411,562 | 11/1946 | Thompson | 248/556 |
| 3,698,663 | 10/1972 | Balke et al. | 244/17.27 |
| 3,921,940 | 11/1975 | Mouille | 244/17.27 |
| 4,431,148 | 2/1984 | Mouille | 244/17.27 |
| 4,458,862 | 7/1984 | Mouille et al. | 244/17.27 |
| 4,720,060 | 1/1988 | Yana | 244/17.27 |

Primary Examiner—Joseph F. Peters, Jr.
Assistant Examiner—Virna Lissi Ansley
Attorney, Agent, or Firm—Martin Smolowitz

[57] ABSTRACT

The suspension device is interposed between the rotor and the fuselage of the helicopter for filtering the vibration exciting forces and moments coming from the rotor. In this helicopter, a speed reducer (1) is provided in a housing mounted on the fuselage (22) by rigid oblique bars (28). According to the invention, there are disposed around the housing of the speed reducer, in a number equal to the number of rigid oblique bars (28), monodirectional antiresonant means (20,21,23,23a,23b,25) connecting the upper ends of the rigid oblique bars (28) to the speed reducer (1).

6 Claims, 4 Drawing Sheets

ANTIRESONANT SUSPENSION DEVICE FOR A HELICOPTER

FIELD OF THE INVENTION

The present invention relates to an antiresonant suspension device for a helicopter, interposed between the rotor and the fuselage of the apparatus for filtering vibration exciting forces and moments coming from the rotor.

BACKGROUND OF THE INVENTION

Among the various antiresonant suspension devices employed at the present time, one of the most widely used is that having three degrees of freedom and possessing the characteristics disclosed in U.S. Pat. Nos. 4,431,148 and 4,458,862 of the applicant.

Such devices are applicable to helicopters comprising a fuselage, a driving unit, a lifting and propelling rotor and a transmission box which acts as a speed reducer located between said driving unit and said rotor and in alignment with the axis of the latter. They mainly comprise a set of at least three support members the upper ends of which are connected to the upper housing of the transmission box whereas the lower ends are articulated to the outer ends of arms arranged radially about the base of the transmission box, to which base they are connected, these arms also being connected in the region of their outer ends to the fuselage at strong points of the latter.

Each radial arm comprises a deformable portion and the various connections of each radial arm are so disposed that they allow it movements by elastic deformation in a radial plane containing the axis of the rotor and the arm. The movement of each radial arm imparts large displacements to a beating weight mounted at the end of a rigid support whose other end is connected to the end of the corresponding axial arm.

Said suspension devices further comprise a suspension plate substantially contained in a plane perpendicular to the axis of the rotor. The central portion of the suspension plate is connected to the bottom of the transmission box and its periphery is connected to the structure of the upper portion of the fuselage of the helicopter. This plate may be formed by a diaphragm which is flexible in bending so as to allow the bottom of the transmission box:

limited alternating movements in vertical translation (pumping), and/or limited alternating movements of oscillation (roll and pitch) about axes contained in the plane of the diaphragm.

The diaphragm is sufficiently rigid in its plane to transmit without substantial deformation the reaction of the driving torque of the helicopter on the transmission box and fuselage.

This plate may also be formed by a horizontal beam the ends of each of the arms of which are connected to the structure of the fuselage by two articulated links operating under tension for transmitting to the transmission box and the fuselage the reaction of the driving torque of the helicopter while allowing small vertical displacements and angular oscillations of the transmission box about axes contained in the plane of the plate.

In these devices, the spring/antiresonant beating weight mechanism interposed between the lower ends of the members supporting the transmission box on the fuselage and the strong attachment points on the top of the fuselage, is arranged horizontally in a plane perpendicular to the axis of the rotor, so that the oscillations of the beating weights produced by the deformations of the flexible portion of the arms occur in vertical planes and the inertial forces generated on the supports of said beating weights therefore have solely a vertical direction.

Although these suspension devices operate in a quite satisfactory manner and it is easy to find compromises for, on one hand, ensuring through said suspensions the transmission between the rotor and the fuselage of static forces and moments which act on the rotor head of the helicopter, and, on the other hand, for obtaining an effective filtering of the dynamic components of the forces and moments which have an effect on said rotor head, and in particular the component of the force perpendicular to the plane of the rotor and the vibrations resulting from the forces and moments in the plane of the rotor, the applicant has found that it is possible to improve them and thereby improve the performances.

SUMMARY OF THE INVENTION

The invention therefore provides for this purpose an antiresonant suspension device in particular for a helicopter. The helicopters for which the device of the invention is particularly adapted comprise:

a fuselage, one or more engines, a lifting rotor, a transmission box forming a speed reducer transmitting through a gear train the power of the engine or engines to the lifting rotor, said speed reducer being located between said fuselage and said rotor whose axis of rotation is coincident with the axis of the vertical output shaft of said speed reducer, an assembly connecting said speed reducer to said fuselage by means of, on one hand, a pylon constituted by a set of at least three rigid oblique bars arranged around said speed reducer in directions concurrent on the axis of rotation of said rotor at a point located between the centre of the latter and the upper part of said speed reducer, said oblique bars being secured by their upper end to the housing of said speed reducer and by their lower end to the upper structure of said fuselage and, on the other hand, a flexible plate disposed between the bottom of said speed reducer and the upper structure of said fuselage and allowing the bottom of said speed reducer limited alternating movements of vertical translation and/or limited alternating movements of oscillation about axes contained in the plane of the plate and intersecting at its centre, but allowing no rotation of the bottom of said speed reducer about the axis of the rotor. The antiresonant suspension device for said speed reducer relative to said fuselage is characterized in that there are disposed about said housing of said speed reducer, in a number equal to the number of said rigid oblique bars, monodirectional antiresonant means which connect the upper ends of the rigid oblique bars to said speed reducer.

In an embodiment of the invention, said antiresonant means comprise arms each disposed in a plane defined by the axis of the rotor and the axis of the corresponding oblique bar, the longitudinal axis of each arm being disposed in a direction substantially parallel to the axis of the rotor.

Each arm is formed by an elongated single member or an assembly affording, on one hand, in its lower part adjacent to the base of the speed reducer to which said arm is articulated at the end of the latter, a portion flexible in a plane containing the axis of the rotor and the axis of the corresponding oblique bar and, on the other hand, in its upper part, adjacent to the top of the speed reducer, a rigid portion to a point of which said arm is articulated in the upper zone of the speed reducer, said rigid portion having an upper end articulated to the upper end of the corresponding oblique bar.

The rigid portion of each arm in the vicinity of its articulation to the upper zone of the speed reducer is connected to the upper end of a rigid lever disposed substantially parallel to the arm whose lower end carries a beating weight.

According to another feature of the invention, the angle $\beta$ made between each oblique bar and the plane perpendicular to the axis of the rotor is between 45° and 70°, with an optimum value of 60°, so that the resulting rigidity of the antiresonant means KI is less than the vertical rigidity of the suspended assembly KV, the relation between KV and KI being determined by the equation $$KI = KV/\tan \beta.$$

The following description with reference to the accompanying drawings, given by way of non-limitative examples, will explain how the invention can be put into practice.

DETAILED DESCRIPTION OF THE PREFERRED EMBODIMENT

Figure 1:
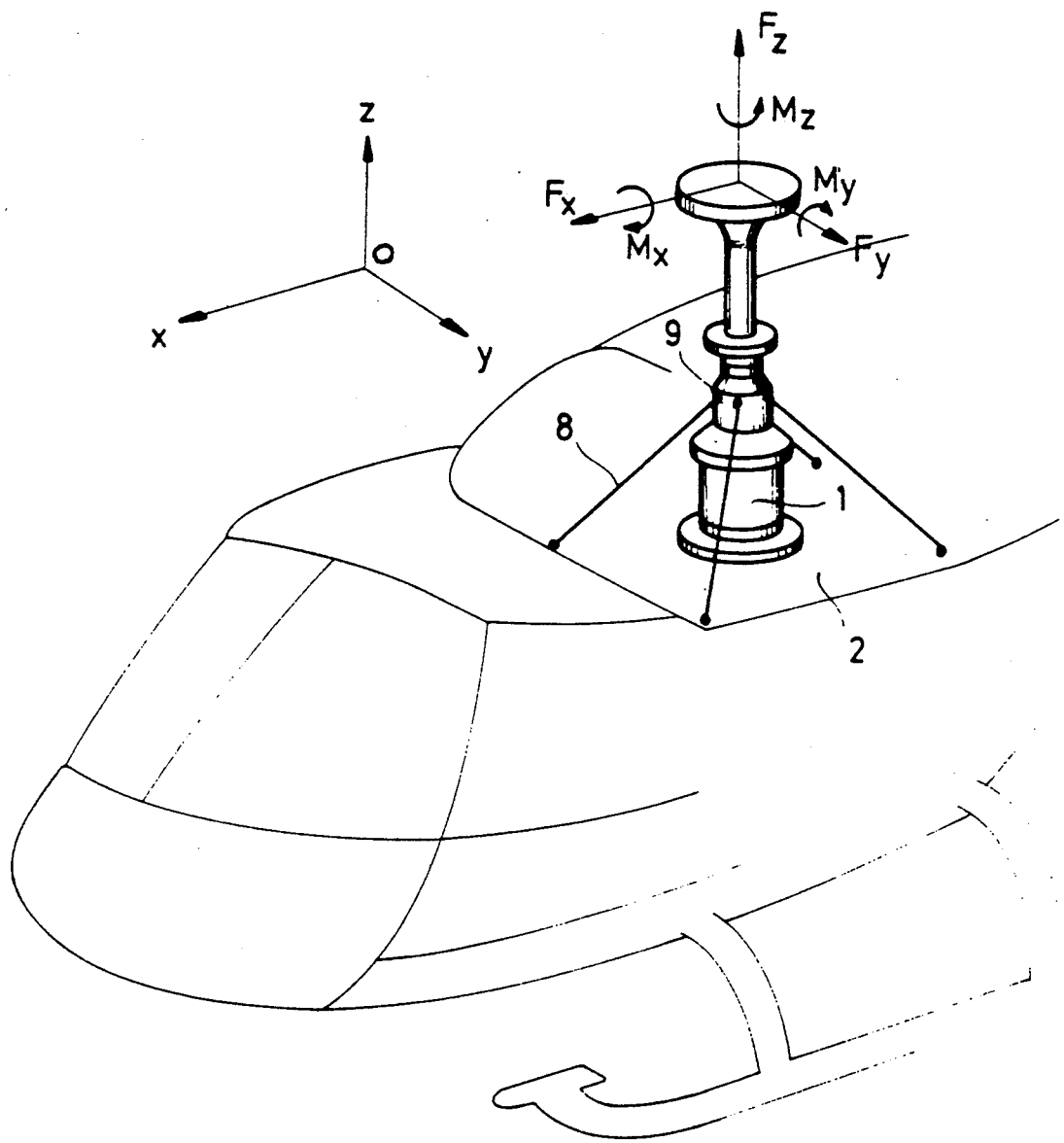
FIG. 1 is a partial diagrammatic view in perspective of a monorotor helicopter on which the antiresonant suspension device according to the invention is installed.

FIG. 1 shows a helicopter having a lifting monorotor to which the present invention is applied. It mainly shows the general architecture of the connection to the strong structure of the fuselage 2 and of the main transmission box 1 which is interposed between the engine (not shown) and the hub of the main rotor for driving the latter in rotation.

This connection is formed by a pylon having four rigid oblique bars 8 which are concurrent relative to the axis of the output shaft of the main transmission box, each of these bars being secured in its upper part to the upper housing of the main transmission box 1 by an articulation 9, and in its lower part to a strong point of the resistant structure of the fuselage 2.

The base of the main transmission box is connected to the upper structure of the fuselage 2 by a connection having high rigidity in the plane of said upper structure.

Schematically represented on the rotor head of the helicopter are the resultants of the forces and moments on the rotor which bias the body of the hub in the reference directions of the apparatus, i.e. Ox forwardly, Oy laterally and Oz upwardly in a direction perpendicular to Ox and Oy.

These forces and moments are:

the force Fz corresponding to the lift of the rotor with a vertical dynamic "pumping" component which imparts to the fuselage vertical vibrations through the bars 8, the moment Mz corresponding to the driving torque which is exerted on the hub support mast and is balanced by a torque exerted in the opposite direction on the housing of the main transmission box 1 and transmitted to the fuselage through the connection of the bottom of the housing to the upper structure of the fuselage, forces Fx and Fy in the plane of the rotor having dynamic components which constitute horizontal vibration excitations of the fuselage having a swaying effet which are transmitted to the fuselage through the bars 8 and the bottom of the main transmission box 1, moments Mx and My which urge the rotor head about the coplanar axes Ox and Oy and tend to tilt the rotor about axes which are perpendicular to the axis of the rotor and pass through the point of convergence of the oblique bars 8. Their dynamic components also act on the fuselage by a swaying effect through the bottom of the transmission box 1.

The general architecture of the connection of the transmission box to the fuselage shown in FIG. 1 is that in which the antiresonant suspension device according to the invention is integrated.

Figure 2:
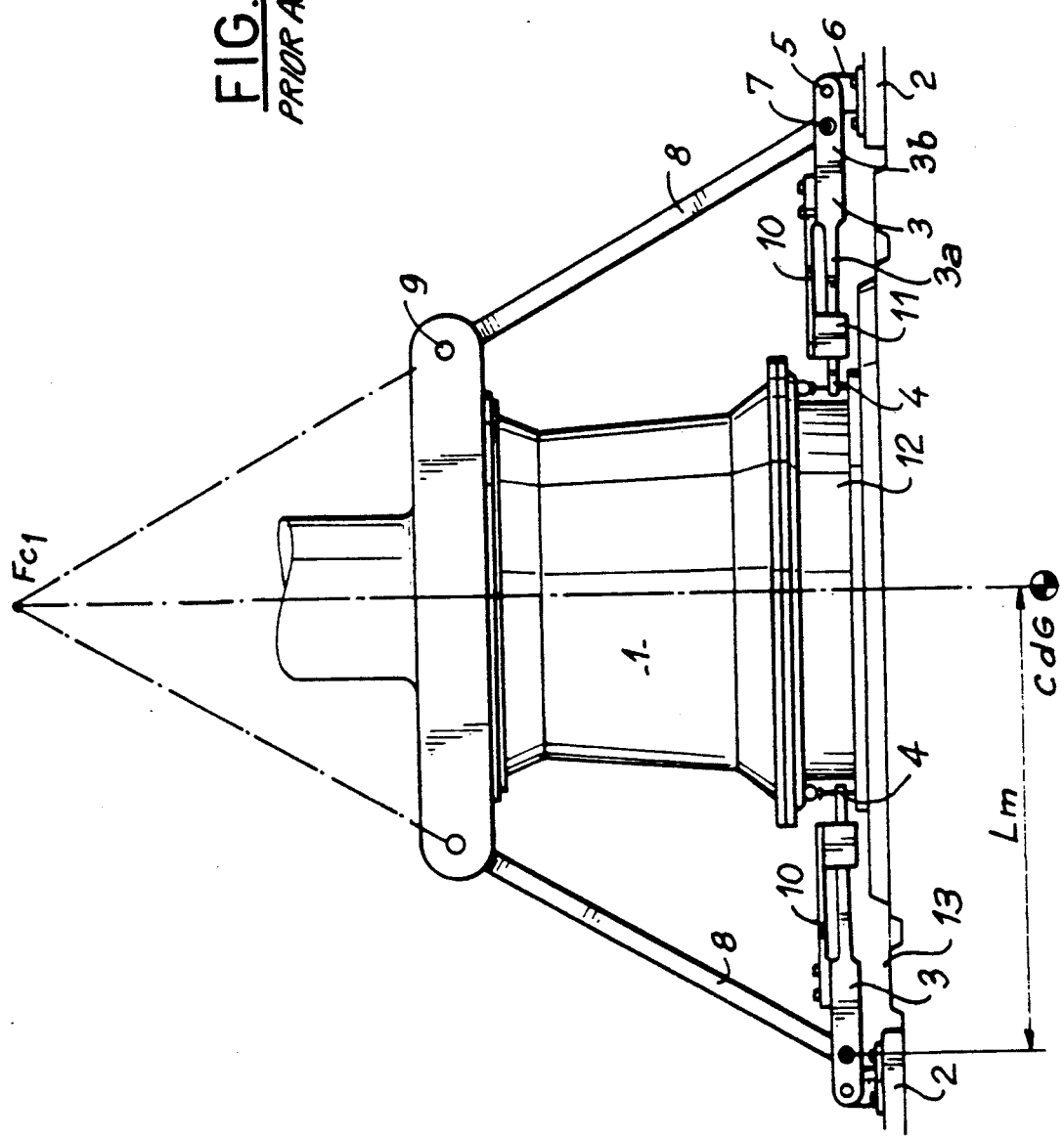
FIG. 2 is an elevational view of an example of an antiresonant suspension device of the prior art.

With reference to FIG. 2, in the illustrated antiresonant suspension device, which affords the characteristics of the devices disclosed in the U.S. Pat. No. 4,458,862, the main transmission box 1, whose axis is coincident with the axis of the rotor, is fixed on top of the fuselage 2 of a helicopter by, in the presently-described embodiment, a pylon formed by four oblique rigid bars 8 spaced 90° apart from one another and extending in directions concurrent on the axis of the rotor at a point of convergence Fc1.

Each bar 8 is articulated at its upper end by an articulation 9 to the upper part of the transmission box 1 and at its lower end to a strong point 6 of the fuselage 2 through an arm 3 which extends radially from the base of the transmission box 1.

Each radial arm 3 is formed by a member or a unit defining, on one hand, adjacent to the transmission box, a flexible portion 3a, and, on the other hand, adjacent to the lower end of the corresponding oblique bar 8, a rigid portion 3b to a point of which the oblique bar 8 is articulated at the lower end 7 of the latter.

The inner end of the flexible portion 3a of the arm 3 is articulated to the base of the transmission box 1 and the outer end of the rigid portion 3b of the arm 3 is articulated to a bracket secured to a strong point 6 of the fuselage 2.

Fixed by bolting to the rigid portion 3b of the arm 3 in the vicinity of the articulation 7, is the end of an elongated rigid support 10 which has an axis substantially parallel to the arm 3 and carries at its other end a beating weight 11.

The bottom of the transmission box 1 is connected to the fuselage 2 of the helicopter by a plate 13 constituted by a planar metal diaphragm in the shape of a circular ring which is perpendicular to the axis of the transmission box and is deformable by bending under the action of forces exerted in the direction of said axis and under the action of tilting moments causing pivotings about the point of intersection of the axis of the transmission box with the plane of the diaphragm which is relatively rigid in tension/compression as concerns forces contained in its plane and is rigid in shear under the action of the torque which is also exerted in its plane.

Figure 3:
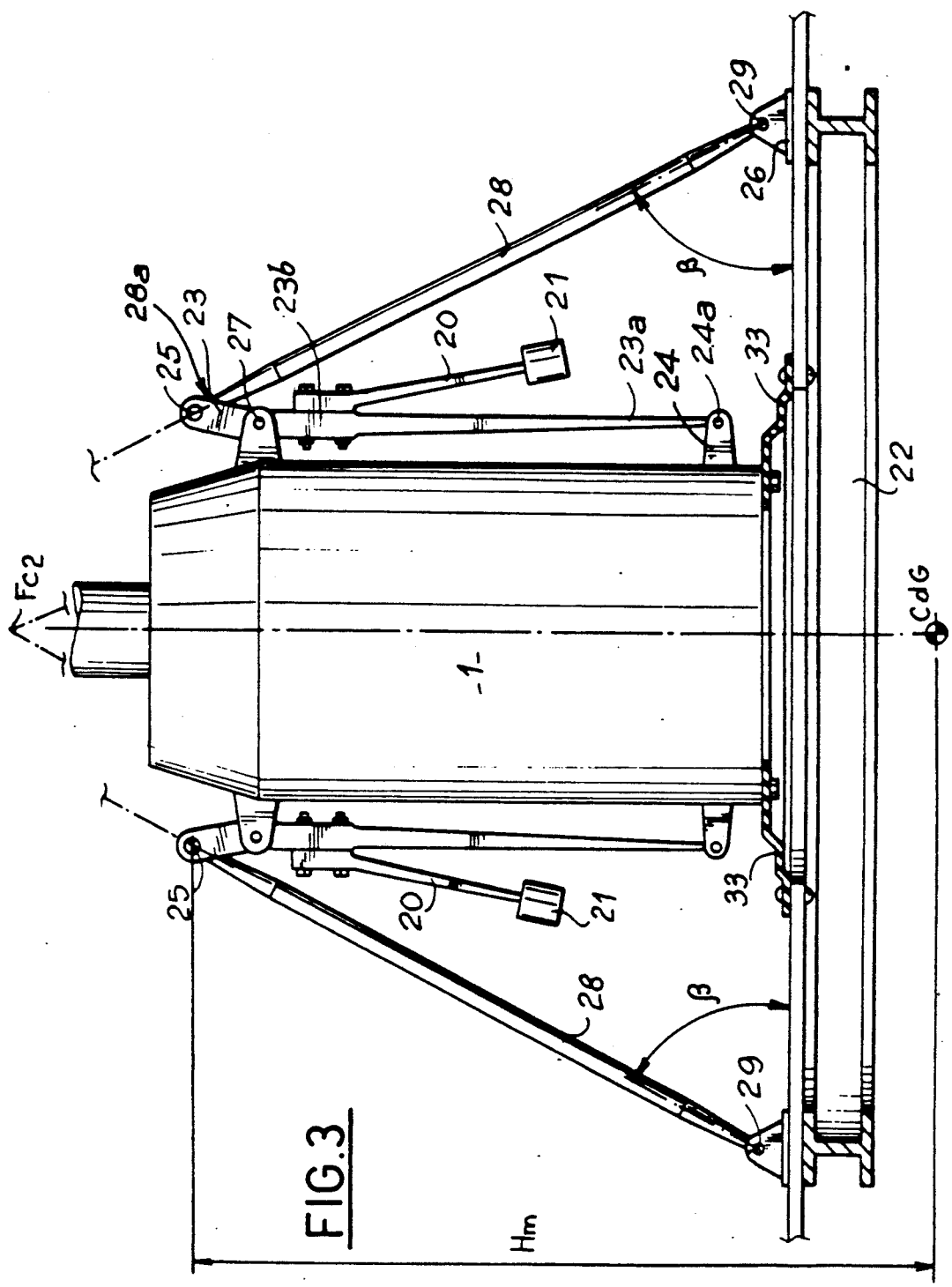
FIG. 3 is an elevational view of an antiresonant suspension device according to the invention.

In the device according to the invention illustrated in FIG. 3, the transmission box 1, whose axis is coincident with the axis of the rotor, is fixed on top of the fuselage 22 of a helicopter by a pylon constituted by four oblique rigid bars 28 spaced 90° apart from one another and extending in directins concurrent on the axis of the rotor at a point of convergence Fc2.

Each bar 28 is articulated at its lower end 29 to a bracket 26 secured to a strong point of the fuselage 22 and at its upper end 28a to the top part of the transmission box 1 through an arm 23 which is arranged to extend longitudinally adjacent to the periphery of the housing of the transmission box 1 and substantially parallel to the axis of the latter.

Each longitudinal arm is formed by a single member or a unit defining, on one hand, in its lower part, a flexible portion 23a, and, on the other hand, adjacent to the upper end of the corresponding oblique bar 28, a rigid portion 23b at a point of which the arm is articulated by an articulation 27 to the top part of the transmission box 1.

The rigid upper end portion 23b of the arm 23 is articulated by an articulation 25 to the upper end 28a of the bar 28, and the lower flexible end portion 23a of the arm 23 is articulated by an articulation 24a to a bracket 24 secured to the base of the transmission box 1.

Fixed by bolting to the rigid portion 23b of the arm 23 in the vicinity of the articulation 27, is the end of an elongated rigid support 20 having an axis substantially parallel to the arm 23 and carrying a beating weight 21 at its end.

The bottom of the transmission box 1 is connected to the fuselage 22 of the helicopter by a plate 33 formed by a planar diaphragm which is of metal or a stratified composite material and is in the shape of a circular ring which is disposed perpendicular to the axis of the transmission box and is deformable by bending under the action of forces exerted in the direction of said axis and under the action of tilting moments resulting in pivoting about the point of intersection of the axis of the transmission box with the plane of the diaphragm which is relatively rigid in tension/compression with respect to forces contained in its plane and rigid in shear under the action of the torque which is also exerted in its plane.

It is therefore clear that in the device according to the invention, each spring/beating weight mechanism, or antiresonant means, is interposed between the upper ends of members supporting the transmission box on the fuselage and attachment points on the top of the transmission box, such means being disposed vertically substantially parallel to the axis of the rotor so that the oscillations of the beating weights produced by the deformations of the flexible portion of the arms occur in planes containing the axis of the rotor and each oblique bar, their direction of operation being then substantially horizontal.

The axial positioning of the deformable arm 23 substantially parallel to the axis of the transmission box, and no longer in a radial position as in the prior art, results in important differences as concerns both the aspects of the static adjustment of the suspension and the properties of the filtering of the vibrations produced by the various components of the dynamic forces and moments coming from the rotor head, and in particular the vertical component (force Fz) and the coplanar vibration excitations (forces Fx, Fy and moments Mx and My).

The advantage of the device according to the invention in comparison with the prior art device will be first of all examined in respect of the static adjustment of the whole of the suspension.

It is known that, apart from its function of filtering the dynamic forces and moments due to the rotor head and transmitted between the main transmission box and the fuselage, a helicopter suspension must also ensure the mechanical connection between said transmission box and said fuselage. It is therefore subjected to the static forces and moments generated by the rotor head some of which are, depending on the different flying configurations, of a very high level and may in this way cause displacements of the transmission box with respect to the fuselage which are, depending on the rigidity of the connection between these two assemblies, liable to be considerable and result in unacceptable disalignments of the connections with the component parts surrounding the transmission box and in particular those of the turbo engines with said transmission box.

The allowed limit for these disalignments in fact determines the rigidity of the connection of the transmission box to the fuselage which is achieved by the assembly comprising the bars and the antiresonant system.

The most critical displacement is the vertical displacement along the axis of the rotor, which has a high load factor, for example in the course of a manoeuvre on the part of the helicopter.

In the case of the prior art, the vertical rigidity of the unit (KV) is equal to the rigidity (KI) of the antiresonant systems mounted between the lower end of the bars and the fuselage.

We have $KV = KI$.

In the case of the suspension according to the invention, the vertical rigidity of the assembly is equal to the rigidity of the antiresonant systems (KI) multiplied by the tangent of the angle ($\beta$) that the rigid oblique bars make with the plane perpendicular to the axis of the rotor passing through the bottom of the transmission box (see FIG. 3).

We here have $KV = KI \times \tan \beta$.

As the vertical rigidity of the connection between the transmission box and the fuselage is determined by the aforementioned disalignment criteria, such a property permits, by judiciously choosing the angle $\beta$, reducing the rigidity of the antiresonant systems.

For example, if we choose:

$$\beta = 60°,$$

we have: $\tan 60° = 1.732$

Therefore, the rigidity to be given in this case to the antiresonant systems KI is equal to $KV/1.732 = 0.58$ KV. Thus it is clear that, with the bars inclined at 60°, the arrangement according to the invention provides a saving of 40% with respect to the rigidity of the antiresonant systems of the prior art.

In practice, the angle $\beta$ will be chosen between the minimum value of 45° for which $\tan \beta = 1$, and the maximum value of 70° allowed by the general architecture of the connection of the main transmission box to the structure of the fuselage by means of a pylon comprising oblique bars affording a point of convergence of the bars located below the plane of the rotor.

The advantage of the device according to the invention in comparison with the device of the prior art as concerns the effectiveness of the filtering of the vibrations will now be examined.

It is known that the performances of the filtering of the dynamic forces and moments of an antiresonant suspension depend on:

the kinematics of the assembly comprising the means fixing the transmission box and the antiresonant means, the dynamic characteristics of the antiresonant systems, the zone of action of the antiresonant systems.

These performances are evaluated by separately examining the vertical dynamic excitation force Fz at the head of the rotor which produces vertical vibrations termed pumping and the coplanar components—forces Fx and Fy and moments Mx and My—which produce the horizontal "swaying" vibrations.

Figure 4:
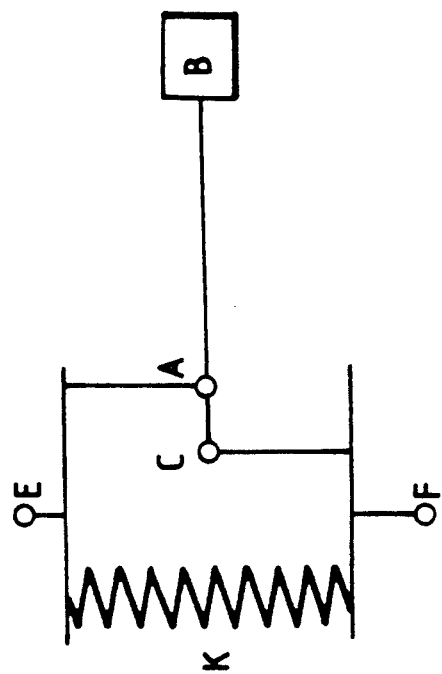
FIG. 4 is a diagrammatic view of an antiresonant means.

Each antiresonant means may in fact be considered to be formed by the schematic elements shown in FIG. 4.

Mounted in parallel between the two interfaces (E and F in which E represents the vibration exciting element and F the strong point of attachment to the fuselage) are: a spring having a rigidity K and a pendulum whose weight concentrated at its end is the beating weight "Mb". The pendulum is mounted in the manner of an articulated lever so that the force of inertia it produces in the region of the ends is amplified in the ratio of the leverage.

If $\lambda$ is the ratio CB/CA of the distance CB between the beating weight B and the most remote articulation C, to the distance CA between the two articulations C and A, and if $b\Omega$ is the excitation pulsation (b being a whole number and $\Omega$ the speed of rotation of the rotor), the rigidity of this antiresonant system is given by:

$$K = Mb\, (\lambda)\, (\lambda - 1)\, (b\Omega)^2$$

It will be noticed that in this equation the beating weight Mb is very closely inversely proportional to the square of $\lambda$, which shows that one should have a ratio $\lambda$ which is as high as possible so as to reduce the beating weight.

Therefore, in the antiresonant suspension devices of the prior art, the vertical rigidity KV of the assembly of the suspension, which is equal to the sum of the static rigidities of the antiresonant systems disposed between each lower end of the bars 8 and the fuselage, must have, as has been seen, a high value and this imposes high values for the ratio (and therefore for the length of the levers 10) and for the beating weights 11.

In an antiresonant suspension according to the invention, the vertical rigidity of the suspension KV determined by the lowest static rigidity, because it is equal to $KI \times \tan \beta$ as already seen, enables the beating weight required for a given effectiveness of the device to be substantially reduced.

Consequently, in the device according to the invention, there may be advantageously adopted for filtering the vertical vibration excitation Fz, the nominal adjustment of the antiresonant means determined for transmitting the static vertical forces.

As concerns the filtering of the coplanar vibrations at Fx, Fy, Mx and My, there must be provided, relative to the nominal adjustment of the antiresonant means, an increase in the beating weight.

This increase in the weight is proportional:

to the horizontal distance between the rotor axis and the connection of the beater to the fuselage (Lm) in the case of the prior devices (see FIG. 2); or to the vertical distance between the centre of gravity of the fuselage and the connection of the arm 23 to the bar 28 (Hm) in the case of the device according to the present invention (see FIG. 3).

In practice, it may be estimated that Hm = 2 Lm. There is consequently obtained, with everything else equal, an effectiveness which is substantially doubled in the device according to the invention in comparison with the prior devices.

In short, the important advantages of the device according to the invention over the prior devices are the following:

Substantial improvement in the performances of the filtering of the dynamic vibration excitations at Fz, Fx, Mx and My.

Significant reduction in the total weight of the suspension, essentially owing to the reduction in the beating weights.

Reduction in the static forces in the flexible arms.

Wider tolerance as concerns the high loading factors, which is a particularly interesting advantage for military helicopters which are expected to effect acrobatic manoeuvres.

Lastly, the antiresonant systems are easier to place between the oblique bars and the housing of the main transmission box in zones usually unoccupied by the transmission means, the flight controls and associated equipments driven by the transmission box.

What is claimed is:

1. In a helicopter comprising:
    a fuselage having an upper structure,
    at least one engine,
    a lifting rotor,
    a transmission box constituting a speed reducer connected to said at least one engine and to said rotor through a gear train for transmitting the power of said at least one engine to said rotor, said speed reducer having a housing and a vertical output shaft and being located between said fuselage and said rotor which has an axis of rotation coaxial with the axis of rotation of said vertical output shaft,
    an assembly connecting said speed reducer to said fuselage and comprising a pylon including a set of at least three rigid oblique bars arranged around said speed reducer in directions which are concurrent on said axis of rotation of said rotor at a point located between the centre of said rotor and an upper part of said speed reducer, means connecting upper ends of said oblique bars to said housing of said speed reducer, said oblique bars being connected by their lower ends to said upper structure of said fuselage, a flexible plate disposed between a bottom of said speed reducer and said upper structure of said fuselage and allowing the bottom of said speed reducer limited alternating movements of vertical translation and limited alternating movements of oscillation about axes which are contained in the plane of said plate and intersect at the centre of said plate, but allowing no rotation of the bottom of said speed reducer about the axis of said rotor relative to said upper structure of said fuselage:
    an antiresonant suspension device for said speed reducer which is relative to said fuselage and comprising monodirectional antiresonant means constituting said means connecting said upper ends of said oblique bars to said housing of said speed reducer, said antiresonant means including beating weights which are disposed about said housing of said speed reducer in substantially vertical positions in a number equal to the number of said rigid oblique bars.

2. Suspension device according to claim 1, wherein each antiresonant means comprises an arm structure contained in a plane containing the axis of said rotor and the axis of the respective oblique bar, each arm structure having a longitudinal axis extending in a direction substantially parallel to the axis of said rotor which is articulated at its lower end to said housing adjacent to the bottom of said speed reducer and defining, in a lower part of said arm structure adjacent to the bottom of said speed reducer, a portion flexible in a plane containing the axis of said rotor and the axis of the respective oblique bar and further defining, in an upper part of said arm structure adjacent to the top of said speed reducer, a rigid portion at a point of which rigid portion said arm structure is articulated to said housing in an upper part of said speed reducer, said rigid portion having an upper end articulated to the upper end of the respective oblique bar, each antiresonant means further comprising a rigid lever having an upper end portion fixed to said rigid portion of said arm structure in the vicinity of the articulation of said rigid portion to said upper part of said speed reducer, said rigid lever being substantially parallel to said arm structure and having a lower end carrying a beating weight.

3. Suspension device according to claim 2, wherein said arm structure is a single member.

4. Suspension device according to claim 2, wherein said arm structure is a unit.

5. Suspension device according to claim 1, wherein an angle $\beta$ made between each oblique bar and a plane perpendicular to the axis of said rotor is between 45° and 70°, so that the resulting rigidity of the antiresonant means KI is less than the vertical rigidity of the suspended assembly KV, the relation between KV and KI being determined by the equation $KI = KV/\tan \beta$.

6. Suspension device according to claim 5, wherein said angle $\beta$ is 60°.

* * * * *